United States Patent
Duggal et al.

(10) Patent No.: US 9,613,007 B2
(45) Date of Patent: Apr. 4, 2017

(54) POSITIONING ANCHORED TEXT ELEMENTS IN A NON-RECTANGULAR FRAME

(71) Applicant: Adobe Systems Incorporated, San Jose, CA (US)

(72) Inventors: Ashish Duggal, New Delhi (IN); Douglas A. Waterfall, Seattle, WA (US); Mohit Yadav, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 186 days.

(21) Appl. No.: 14/452,438

(22) Filed: Aug. 5, 2014

(65) Prior Publication Data

US 2016/0041950 A1 Feb. 11, 2016

(51) Int. Cl.
*G06F 17/21* (2006.01)

(52) U.S. Cl.
CPC .................. *G06F 17/211* (2013.01)

(58) Field of Classification Search
CPC ..................................................... G06F 17/211
See application file for complete search history.

(56) References Cited

U.S. PATENT DOCUMENTS

| | | | | |
|---|---|---|---|---|
| 4,503,515 A * | 3/1985 | Cuan | ..................... | G06F 17/241 400/63 |
| 4,648,067 A * | 3/1987 | Repass | .................. | G06F 17/241 715/205 |
| 5,097,418 A * | 3/1992 | Nurse | .................... | G06F 17/241 715/207 |
| 5,111,397 A * | 5/1992 | Chirokas | ................ | G06F 17/241 715/205 |
| 6,081,816 A * | 6/2000 | Agrawal | ................ | G06F 17/211 715/210 |
| 6,971,062 B1 * | 11/2005 | Tolpin | ................ | G06F 17/30861 707/E17.107 |
| 7,024,621 B1 * | 4/2006 | Tolpin | .................. | G06F 17/2247 715/209 |
| 2005/0138555 A1 * | 6/2005 | Fushiki | ................. | G06F 17/211 715/247 |
| 2006/0156225 A1 * | 7/2006 | Burago | .................. | G06F 17/217 715/251 |
| 2006/0242571 A1 * | 10/2006 | Lin | ........................ | G06F 17/227 715/201 |
| 2007/0160290 A1 * | 7/2007 | Sprang | .................... | G06T 11/60 382/176 |
| 2008/0104509 A1 * | 5/2008 | Walker | .................... | G06T 11/60 715/276 |

(Continued)

*Primary Examiner* — Asher Kells
(74) *Attorney, Agent, or Firm* — Wolfe-SBMC

(57) ABSTRACT

Frame-shaped anchored elements are described. In one or more embodiments, anchored text elements are identified for primary text that is located in a non-rectangular frame (e.g., a circular frame, a rounded rectangle frame, and so on) and that references the anchored text elements. The anchored text elements may be footnotes or endnotes that are identified for primary text located in a non-rectangular text box, for example. Once identified, the anchored text elements may be fit within and at a bottom of the non-rectangular frame. The anchored text elements are considered to fit "within" the non-rectangular frame insofar as the anchored text elements do not extend outside the boundaries of the non-rectangular frame.

20 Claims, 10 Drawing Sheets

(56) References Cited

U.S. PATENT DOCUMENTS

| | | | |
|---|---|---|---|
| 2009/0046918 A1* | 2/2009 | Dejean | G06K 9/2054 |
| | | | 382/135 |
| 2012/0102394 A1* | 4/2012 | Nordback | G06F 17/211 |
| | | | 715/247 |
| 2012/0324332 A1* | 12/2012 | Zaragoza | G06F 9/4443 |
| | | | 715/234 |

* cited by examiner

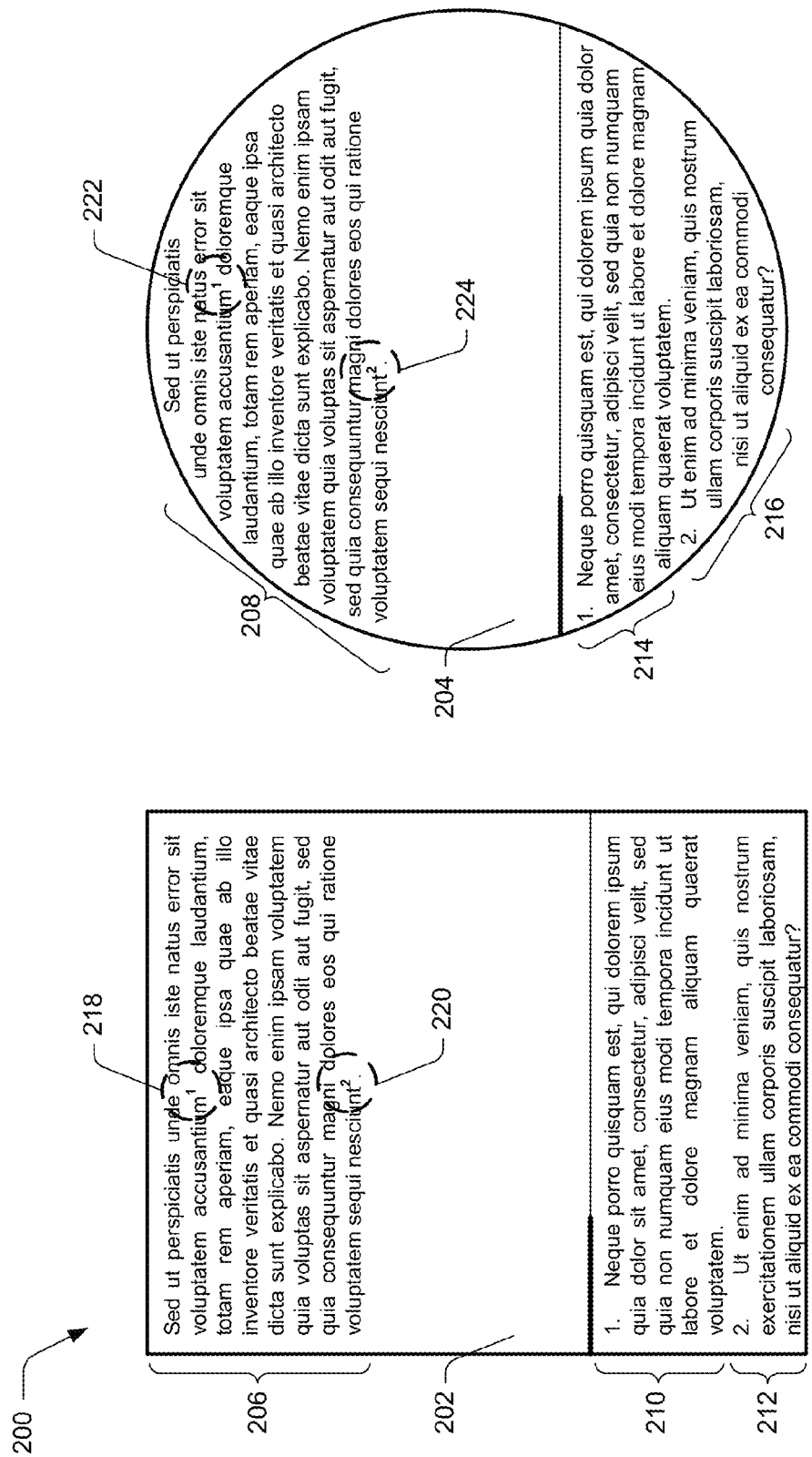

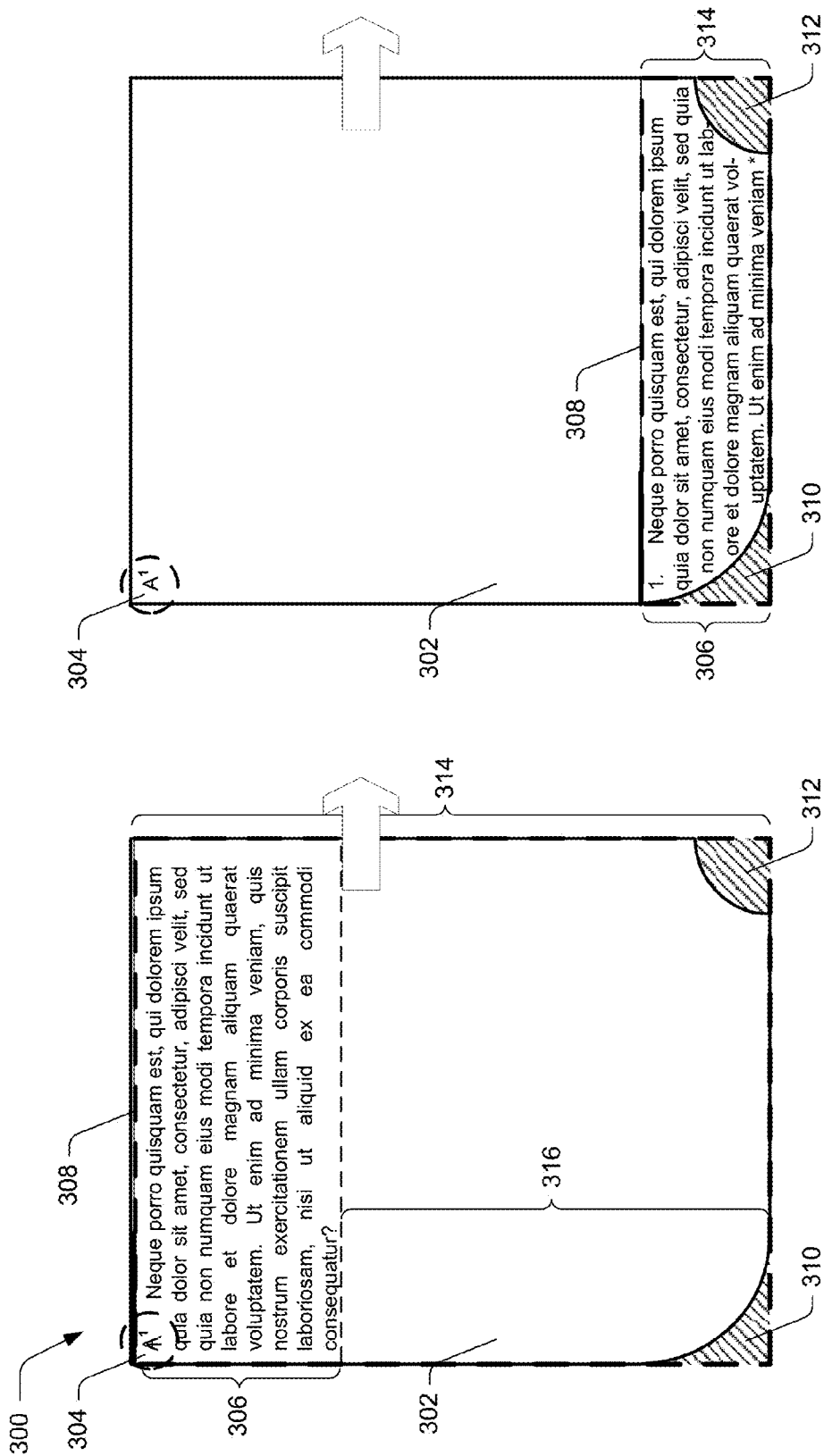

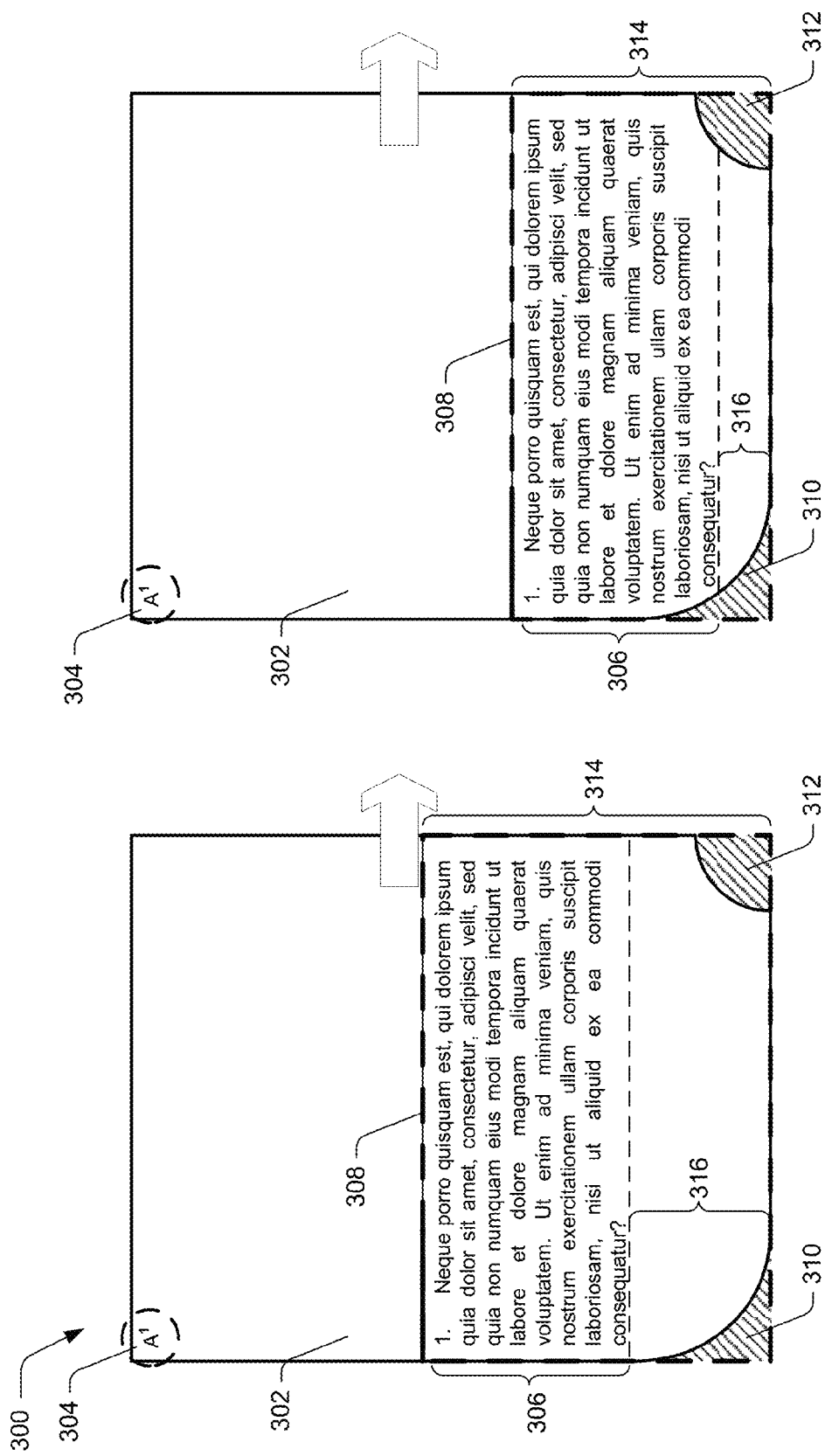

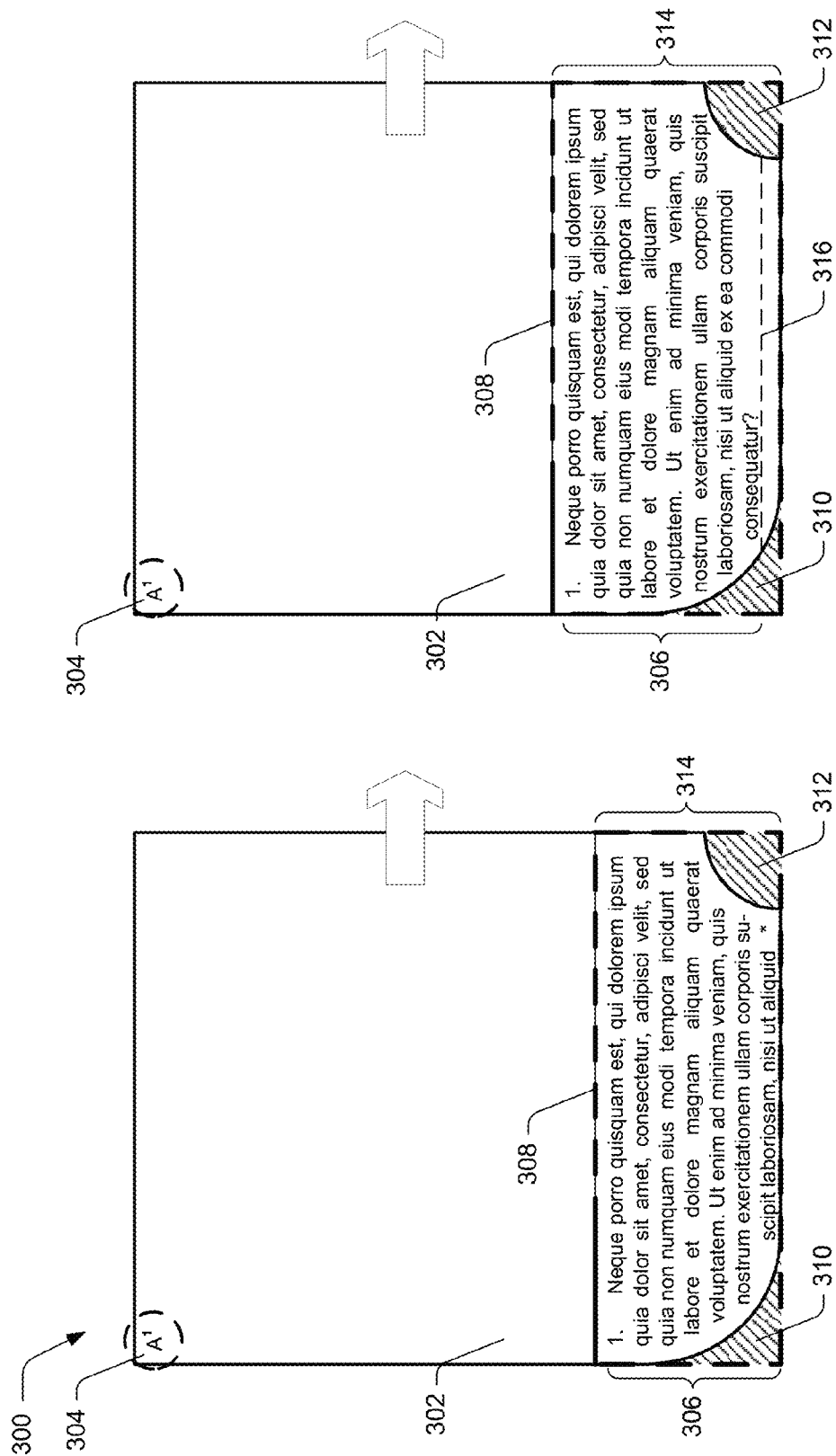

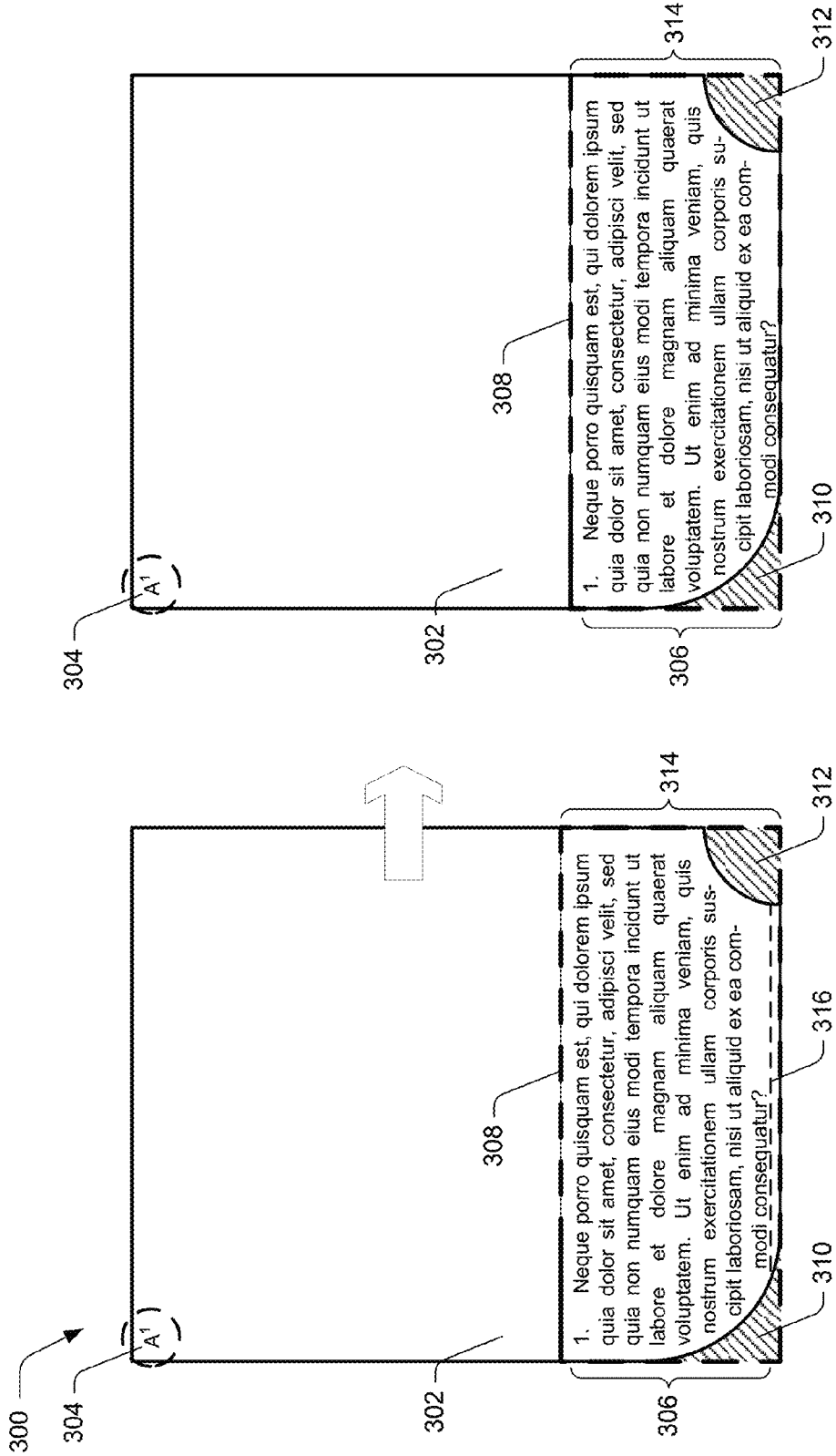

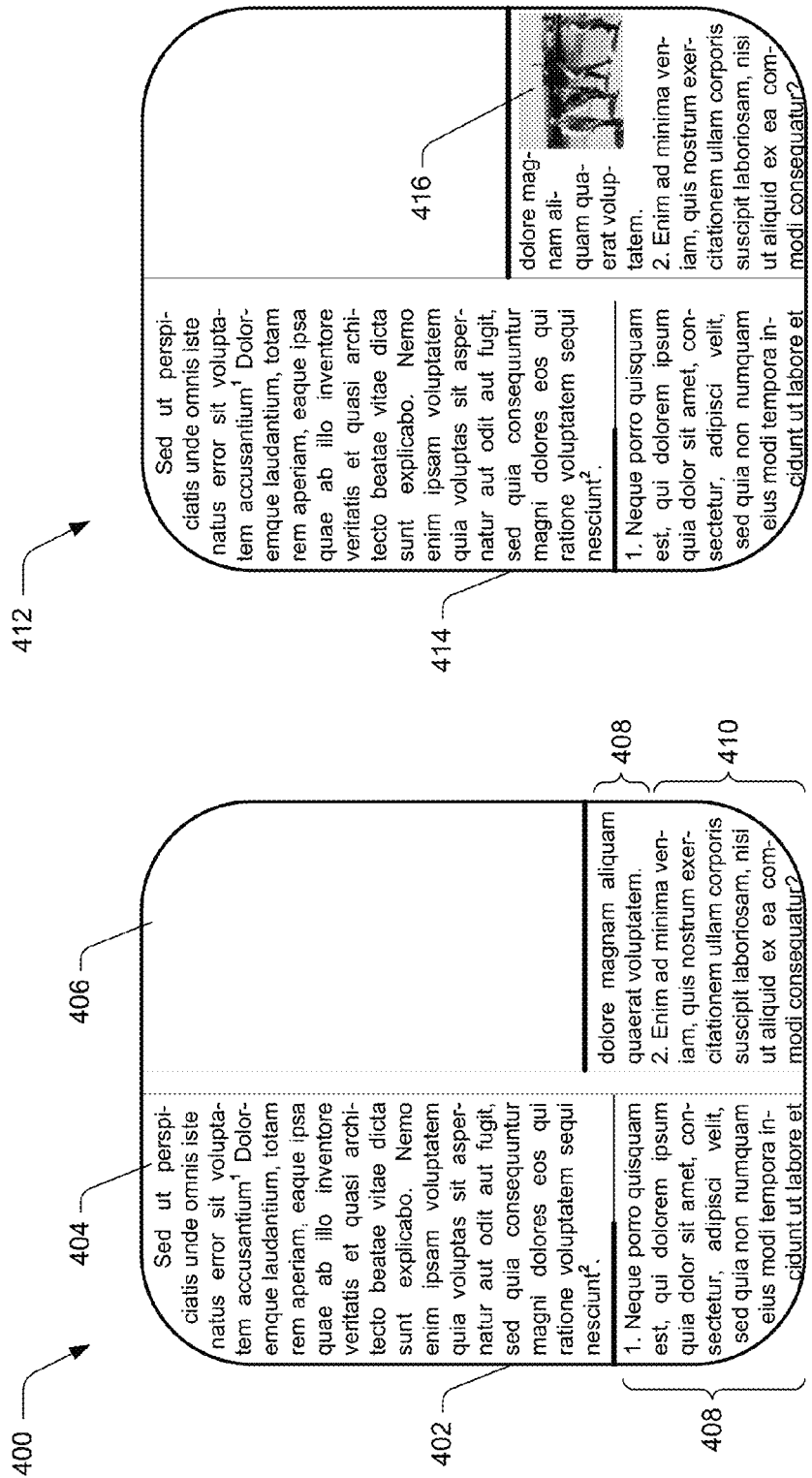

POSITIONING ANCHORED TEXT ELEMENTS IN A NON-RECTANGULAR FRAME

BACKGROUND

Document designers, when laying out pages of a document, often use frames to organize or compartmentalize elements (e.g., text and images) of those pages. A text box may be used, for instance, to separate text of the text box from other text in the document or from text of other text boxes in the document.

To create visually pleasing documents, document designers may use a variety of differently-shaped frames. Some such frames may be rectangular in shape while others are non-rectangular (e.g., circle-shaped, oval-shaped, and so on). Consider a magazine page, that has a collage-like layout with multiple pictures and one or more portions that include text describing the pictures. In such layouts, it is often the case that at least one, if not more than one, of the multiple pictures or portions that includes the text has a non-rectangular shape.

Nevertheless, conventional techniques provide document designers with a limited set of features to configure content of non-rectangular frames. Thus, when a non-rectangular frame is chosen for a layout, document designers may be forced to manually configure elements that they locate within the frame. This can result in lost productivity and frustration for document designers.

SUMMARY

Frame-shaped anchored elements are described. In one or more embodiments, anchored text elements are identified for primary text that is located in a non-rectangular frame (e.g., a circular frame, a rounded rectangle frame, and so on) and that references the anchored text elements. The anchored text elements may be footnotes or endnotes that are identified for primary text located in a non-rectangular text box, for example. Once identified, the anchored text elements may be fit within and at a bottom of the non-rectangular frame. The anchored text elements are considered to fit "within" the non-rectangular frame insofar as the anchored text elements do not extend outside the boundaries of the non-rectangular frame. The anchored text elements also may, for non-rectangular frames with multiple columns, be split into multiple portions that are each fit into one of the multiple columns. Additionally, the anchored text elements may be wrapped around other elements (e.g., images) that are located in a region where the anchored elements are to be fit.

To fit anchored elements within a non-rectangular frame, the anchored elements may be initially positioned in the non-rectangular frame. The initial position may be determined by computing a first line in the non-rectangular frame at which to begin composition of the anchored text elements. The anchored text elements may then be composed from the first line to downward fill a region of the non-rectangular frame between the first line and a bottom boundary of the non-rectangular frame. If it is determined that the anchored elements do not fit entirely within the region or space remains between a bottom of anchored text elements and a bottom boundary of the non-rectangular frame, the anchored text elements may be repositioned. This process may be repeated iteratively until the anchored text elements fit entirely within the non-rectangular frame and there is no space between the bottom of the anchored text elements and the bottom boundary.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 2 illustrates examples of anchored text elements that are fit within a rectangular frame and within a non-rectangular frame.

FIGS. 3a-3h illustrate an example embodiment in which an anchored text element is iteratively repositioned to fit within and at a bottom of a non-rectangular frame.

FIG. 4a illustrates an example embodiment showing anchored text elements that are fit within a non-rectangular frame having columns.

FIG. 4b illustrates an example embodiment showing anchored text elements that are wrapped around an image element located in a non-rectangular frame.

DETAILED DESCRIPTION

Overview

Figure 1:
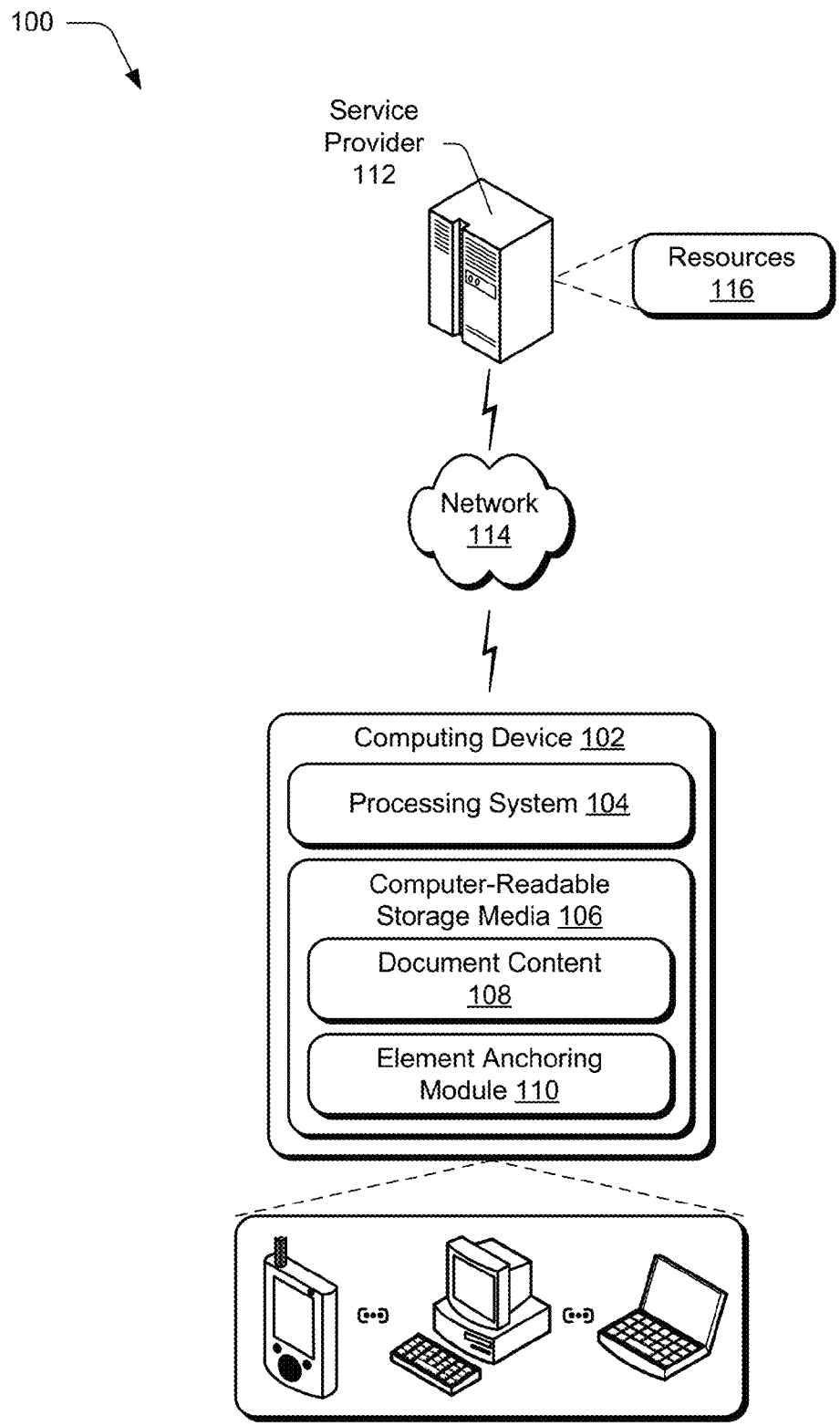
FIG. 1 is an illustration of an environment in an example embodiment that is operable to employ techniques described herein.

Configuring text within a non-rectangular frame (e.g., a non-rectangular text box) may be time-consuming for a user. Conventional techniques simply lack support to configure non-rectangular text boxes in certain ways. For example, conventional techniques lack support to create anchored text elements (e.g., footnotes and endnotes) so that they are entirely within a non-rectangular text box. Consequently, a user who wishes to include anchored text elements in a non-rectangular text box may be forced to manually adjust the anchored text elements, line-by-line, until a desired fit is achieved. Doing so may be time consuming, however. As a result, users may be discouraged from configuring non-rectangular frames in some ways, which may in turn limit the applications for which non-rectangular frames are ultimately used.

Frame-shaped anchored elements are described. In one or more embodiments, anchored elements (e.g., footnotes or endnotes) are automatically fit within a non-rectangular frame (e.g., a non-rectangular text box). The term "anchored element" generally refers to a note that provides supplemental information about text contained on a page, such as a source of the text. In some embodiments, the anchored element is found at a bottom of a page. By way of example, an anchored element may be a footnote, endnote, or other note that includes related links (e.g., a uniform resource locator (URL)), information, terms, etc.

The text contained on the page, in which the anchored element is referenced, is generally referred to as "primary text". In some embodiments, the primary text is located above the anchored element. In many cases, the primary text is aligned at a top of the page although other alignments that position the primary text above anchored elements are also contemplated. In the primary text, reference may be made to an anchored element using a small number appearing after a portion of the primary text, such as after a word or term for which the referenced anchored element provides the supplemental information.

In conjunction with the techniques described herein, the primary text and anchored elements may be contained within and aligned relative to frames (e.g., text boxes), rather than being contained within and aligned relative to pages. It should be contemplated that a frame may consume nearly an entire page, however. In such a case, the primary text and anchored elements may effectively be contained within and aligned substantially with the page in the manner described above.

The anchored elements are considered to fit "within" the non-rectangular frame insofar as they do not extend outside a border of the non-rectangular frame. Additionally, the anchored elements are positioned at a bottom of the non-rectangular frame, such that there is no space between a bottom of the anchored elements and a bottom boundary of the frame.

Consider an example in which the anchored elements are endnotes or footnotes referenced by primary text that is top-aligned in the non-rectangular text box. Also consider that font sizes of the primary text and the endnotes or footnotes may be measured using "points". Using the techniques described herein, the endnotes or footnotes may be bottom-aligned in the non-rectangular text box so that there are zero points of space between a last text line of the endnotes or footnotes and a bottom boundary of the non-rectangular text box. In addition to being bottom-aligned, the endnotes or footnotes are also positioned so that they are contained entirely within the non-rectangular text box.

Further, the techniques for frame-shaped anchored elements described herein may enable a user to simply enter text for an anchored element (e.g., an endnote or footnote) that is referenced by primary text, and have the anchored element automatically positioned within and at a bottom of a non-rectangular frame in which the primary text is located. In other words, the anchored elements may be positioned without receiving element-fitting inputs from the user to fit the anchored elements within the non-rectangular frame. In one or more embodiments, the anchored elements may be identified without a user entering text to define the anchored elements. Instead, a user may simply select a reference that is to be referenced by the primary text and cited by way of an endnote or footnote. Once selection of the reference is made, the endnote or footnote may be automatically inserted into the non-rectangular frame in the manner described above, and without receiving element-fitting inputs from a user to do so.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example embodiment that is operable to employ techniques described herein. The illustrated environment 100 includes a computing device 102 having a processing system 104 that may include one or more processing devices (e.g., processors) and one or more computer-readable storage media 106. The illustrated environment 100 also includes document content 108 and an element anchoring module 110 embodied on the computer-readable storage media 106 and operable via the processing system 104 to implement corresponding functionality described herein. In at least some embodiments, the computing device 102 may include functionality to access web-based resources (e.g., content and services), browse the Internet, interact with online providers, and so forth as described in further detail below.

The computing device 102 may be configured as any suitable type of computing device. For example, the computing device 102 may be configured as a desktop computer, a laptop computer, a mobile device (e.g., assuming a handheld configuration such as a tablet or mobile phone), a tablet, a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 6.

The environment 100 further depicts one or more service providers 112, configured to communicate with computing device 102 over a network 114, such as the Internet, to provide a "cloud-based" computing environment. Generally speaking, a service provider 112 is configured to make various resources 116 available over the network 114 to clients. In some scenarios, users may sign up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, document editing services, email services, web page editing services, presentation editing services, document storage and/or sharing services (e.g., Dropbox®), social network services (e.g., Facebook®, Twitter®, Instagram®, and the like), and so forth.

These sources may serve as significant amounts of document content. Document content 108 may represent such document content, which may be formatted in any of a variety of document formats, including but not limited to plain text, TXT, RTF, DOC, DOCX, PDF, HTML, PostScript, and so on. The document content made available through the services may be posted by users that have accounts with those services. For example, a user having an account with a document storage and/or sharing service may upload documents, such as those created with a word processing application at the user's local computing device, or those sent to the user via electronic means. A user of the document storage and/or sharing service may then share their uploaded documents with others, such as by providing a link to a folder containing the documents or to a profile of the user.

The element anchoring module 110 may represent functionality to implement techniques for frame-shaped anchored elements as described herein. For example, the element anchoring module 110 may be configured in various ways to automatically fit anchored text elements (e.g., endnotes or footnotes) within and at a bottom of a non-rectangular frame (e.g., non-rectangular text box). The element anchoring module 110 may also be configured, prior to fitting the anchored text elements, to identify them for primary text located in the non-rectangular frame.

To automatically fit the anchored text elements within the non-rectangular frame, the element anchoring module 110 may be configured to initially position the anchored text elements in the frame. The element anchoring module 110 may determine the initial position by computing a first line in the non-rectangular frame at which to begin composition of the anchored text elements. The element anchoring module 110 may then cause the anchored text elements to be composed in the non-rectangular frame, starting at the first line. From the first line, the element anchoring module 110 may cause the anchoring elements to be composed downward to fill a region of the non-rectangular frame between the line and a bottom boundary of the non-rectangular frame.

When the anchored text elements are being composed, the element anchoring module 110 may determine that there is not enough space in the region to fit the anchored elements. Alternately, the element anchoring module 110 may determine that space remains between a bottom of the composed anchored text elements and the bottom boundary of the non-rectangular frame. Responsive to making either such determination, the element anchoring module 110 is configured to reposition the anchored text elements within the non-rectangular frame. The element anchoring module 110 may be configured to reposition the anchored text elements by again computing the first line and composing the anchored text elements. The element anchoring module 110 may repeat this iterative repositioning until the anchored text elements fit entirely within the non-rectangular frame and no space remains between the bottom of the anchored elements and the bottom boundary of the non-rectangular frame.

The element anchoring module 110 may be implemented as a software module, a hardware device, or using a combination of software, hardware, firmware, fixed logic circuitry, etc. Further, the element anchoring module 110 may be implemented as a standalone component of the computing device 102 as illustrated. In addition or alternatively, the element anchoring module 110 may be configured as a component of an application, an operating system of the computing device 102, a plug-in module, a standalone service or a service integrated with other services, or other device application.

In at least some embodiments, the element anchoring module 110 is configured to operate in connection with document editing applications that may use application-specific and/or proprietary formats.

Having considered an example environment, consider now a discussion of some example details of the techniques for frame-shaped anchored elements in accordance with one or more embodiments.

Frame-Shaped Anchored Elements Details

This section describes some example details of frame-shaped anchored elements in accordance with one or more embodiments. FIG. 2 depicts generally at 200 examples of anchoring anchored text elements within and at the bottom of text frames. In particular, FIG. 2 depicts examples of anchored text elements that are fit within a rectangular frame 202 and within a non-rectangular frame 204.

In FIG. 2, both the rectangular frame 202 and the non-rectangular frame 204 include respective primary text 206, 208 and anchored elements 210, 212, 214, 216. The rectangular frame 202 and non-rectangular frame 204 may be text boxes included within respective documents (e.g., document content 108). In this example, the primary text 206 references anchored element 210 at 218. In a similar manner, the anchored element 212 is referenced in the primary text 206 at 220, the anchored element 214 referenced in the primary text 208 at 222, and the anchored element 216 referenced in the primary text 208 at 224. The anchored elements 210, 212, 214, 216 may comprise footnotes or endnotes for the corresponding primary text 206, 208.

The primary text 206 is illustrated as being top-aligned within the rectangular frame 202, and the primary text 208 is illustrated as being top-aligned within non-rectangular frame 204. Further, the anchored elements 210, 212 are illustrated as being bottom-aligned within the rectangular frame 202, and the anchored elements 214, 216 are illustrated as being bottom-aligned within the non-rectangular frame 204. It should be noted that the primary text 206, 208 and the anchored elements 210, 212, 214, 216 are illustrated as being contained entirely within the boundaries of the respective frame, and juxtaposed with the boundaries of the respective frame.

Conventional techniques fail to provide support for automatically fitting anchored elements 214, 216 within the non-rectangular frame 204 in the manner illustrated, however. With conventional techniques, users may instead be forced to manually adjust the anchored elements 214, 216, by providing element-fitting inputs, until such a fit is achieved.

Using the techniques for frame-shaped anchored elements described herein, the element anchoring module 110 may automatically fit the anchored elements 214, 216 within the non-rectangular frame 204 in the manner illustrated. Accordingly, the anchored elements 214, 216 may be fit within the non-rectangular frame 204 without receiving element-fitting inputs from a user to do so. To fit the anchored elements 214, 216 within and at a bottom of the non-rectangular frame, the element anchoring module 110 may initially position the anchored elements 214, 216 within the non-rectangular frame 204, and iteratively reposition the anchored elements 214, 216 until the illustrated fit is achieved, e.g., the anchored elements 214, 216 are contained within the non-rectangular frame, and bottom-aligned with a bottom boundary of the non-rectangular frame 204.

To determine the initial position of the anchored elements 214, 216, the element anchoring module 110 may cause a rectangular box, equal in size to the non-rectangular frame 204, to be created. The element anchoring module 110 may then take the intersection of this box with the non-rectangular frame 204 and cause the anchored elements 214, 216 to be composed in a box created by the intersection. It is assumed that the anchored elements 214, 216 fit entirely into this initially-created box and that there is at least some space between the anchored elements 214, 216 and a bottom of the box.

Given the initial positioning of the anchored elements 214, 216 in the box created, the element anchoring module 110 may calculate a "LastGoodTryHeight" and a "LastEmptyHeightRemaininginFootnoteBox". The term "LastGoodTryHeight" may represent a last height of the box in which the anchored elements 214, 216, when composed, fit entirely within the box. In comparison, the term "LastEmptyHeightRemaininginFootnoteBox" may represent a measure of space remaining between a bottom of the anchored elements 214, 216 and a bottom boundary of the box. When the LastEmptyHeightRemaininginFootnoteBox is greater than zero, the element anchoring module 110 is configured to perform another iteration, in which it reduces the height of the box. Specifically, the element anchoring module 110 calculates a new height of the box according to the following pseudo code:

NewTryHeight=LastGoodTryHeight−LastEmptyHeightRemaininginFootnoteBox
   if (NewTryHeight<=LastBadTryHeight)
   NewTryHeight=(LastGoodTryHeight+LastBadTryHeight)/2

Here, the term "NewTryHeight" represents a new height of the box in which the element anchoring module 110 will cause the anchored elements 214, 216 to be composed. The term "LastBadTryHeight" represents a last height of the box in which the element anchoring module 110 caused composition of the anchored elements 214, 216 to begin, but in which there was not enough space to compose an entirety of the anchored elements 214, 216. Although the bottom of the box will not be changed, the top of the box will be changed so that a height of the box is set to the NewTryHeight. It should be noted that a variety of different units may be used to measure these various heights. For example, the different heights may be measured using points, a unit of measurement generally indicative of font size and or line density. Alternately or in addition, the different heights may be measured using inch-based units, metric units, pixels, and so on.

Regardless of the unit of measurement used, the element anchoring module 110 can cause composition of the anchored elements 214, 216 to begin in the box subsequently created with a height equal to the NewTryHeight. Given the new box, three different scenarios may occur based on composition of the anchored elements 214, 216.

In a first scenario, the anchored elements 214, 216 fit entirely within the box (the anchored elements 214, 216 are not overset) and space remains between a bottom of the anchored elements 214, 216 and a bottom boundary of the box. When this scenario occurs, the element anchoring module 110 causes the LastGoodTryHeight to be set to the NewTryHeight, and again calculates the LastEmptyHeightRemaininginFootnoteBox, which given the remaining space is greater than zero. Consequently, the element anchoring module 110 may perform another iteration, in which it again reduces the height of the box in the manner discussed above.

In a second scenario, the box is too small to fit the anchored elements 214, 216 entirely (the anchored elements 214, 216 are overset). When this scenario occurs, the element anchoring module 110 increases the size of the box. To do so, the element anchoring module 110 first causes the LastBadTryHeight to be set to the NewTryHeight. The element anchoring module 110 then causes the NewTryHeight to be recalculated according to the pseudo code above. In both the first and second scenarios, the element anchoring module 110 causes composition of the anchored elements 214, 216 to begin in the box with a height of the recalculated NewTryHeight.

In a third scenario, the element anchoring module 110 determines that the anchored elements 214, 216 fit entirely within the non-rectangular frame 204, and there is no space between a bottom of the anchored elements 214, 216 and a bottom of the box. Once the element anchoring module 110 makes such a determination, the anchored elements 214, 216 are considered to be "fit" within and at the bottom of the non-rectangular frame 204.

FIGS. 3a-3h illustrate an example at 300 in which an anchored text element is iteratively repositioned to fit within and a bottom of a non-rectangular frame. In particular, each of FIGS. 3a-3h illustrates one iteration of the positioning and repositioning process performed by the element anchoring module 110. It should be noted that FIGS. 3a-3h may not be drawn to scale. Thus any measurements (e.g., distances indicated in "points") included in the discussion may not be represented accurately in these figures.

Each of FIGS. 3a-3h includes non-rectangular frame 302, primary text 304 ("A$^1$"), and anchored element 306. In these figures, the primary text 304 references anchored element 306 via a superscripted "1". For the purpose of discussion, it is assumed that the non-rectangular frame 302 has a height of 400 points.

FIG. 3a represents a first iteration of the anchored element positioning performed by the element anchoring module 110. In the first iteration, a top of a box used to fit the anchored element 306 is not yet known. As discussed above, the element anchoring module 110 may create an initial box in which the anchored element 306 is to be composed. The element anchoring module 110 may do so by creating a rectangular box 308 (depicted using the heavy dashed line) that for the first iteration is equal in size to the non-rectangular frame 302 (e.g., 400 points high), then taking an intersection of this rectangular box 308 with the non-rectangular frame 302. The cutouts 310, 312 (the regions depicted using the hatching) represent portions of the rectangular box 308 that the non-rectangular frame does not intersect with, and in which the anchored text is not to be composed.

In this first iteration, the height 314 of the box in which the anchored element 306 is composed is 400 points. The element anchoring module 110 causes the anchored element to be composed in this 400-point high box by starting composition at a first line in the box, then filling it in downward. In the first iteration, the anchored element 306 fits entirely within the box. Thus, the element anchoring module 110 calculates an amount of space 316 between the bottom of the anchored element and a bottom boundary of the box. The amount of space 316 represented in FIG. 3a is 298.2 points. Given that the anchored element 306 fits entirely within the box and that the amount of space 316 is greater than zero, the element anchoring module 110 computes the LastGoodTryHeight and the LastEmptyHeightRemaininginFootnoteBox. After the first iteration, the LastGoodTryHeight is 400 points and the LastEmptyHeightRemaininginFootnoteBox is 298.2 points. Using these values, the element anchoring module 110 then computes the NewTryHeight according to the pseudo code above. The NewTryHeight is calculated here by subtracting the LastEmptyHeightRemaininginFootnoteBox (298.2 points) from the LastGoodTryHeight (400 points). Thus, the value of NewTryHeight is set to 100.8 points.

FIG. 3b represents a second iteration of the anchored element positioning performed by the element anchoring module 110. In the second iteration, the height 314 of the box in which the anchored element 306 is composed is 100.8 points. In the second iteration, the anchored element 306 cannot fit entirely within the box. Said another way, the anchored element 306 is overset. Thus, the box used for the second iteration is considered a "bad try". Given that the anchored element 306 does not fit entirely within the box, the element anchoring module 110 sets the LastBadTryHeight to the value of the NewTryHeight, which in this case is 100.8 points. The NewTryHeight is again calculated according to the pseudo code above. After the second iteration, the NewTryHeight satisfies the condition that it is less than or equal to the LastBadTryHeight. Based on the pseudo code, the NewTryHeight is therefore recalculated by summing the LastGoodTryHeight (400 points) with the LastBadTryHeight (100.8 points), and dividing the sum by two. Thus, the value of NewTryHeight is set to 250.9 points.

FIG. 3c represents a third iteration of the anchored element positioning performed by the element anchoring module 110. In the third iteration, the height 314 of the box in which the anchored element is composed is 250.9 points. In the third iteration, the anchored element 306 again fits entirely within the box. Thus, the element anchoring module 110 calculates, for the third iteration, an amount of space 316 between the bottom of the anchored element 306 and a bottom boundary of the box. The amount of space 316 represented in FIG. 3c is 149.1 points. Given that the anchored element 306 fits entirely within the box and that the amount of space 316 is greater than zero, the element anchoring module 110 computes both the LastGoodTryHeight and the LastEmptyHeightRemaininginFootnoteBox in conjunction with the third iteration. After the third iteration, the LastGoodTryHeight is 250.9 points and the LastEmptyHeightRemaininginFootnoteBox is 149.1 points.

Using these values, the element anchoring module 110 then computes the NewTryHeight in conjunction with the third iteration, and according to the pseudo code above. It follows then that the NewTryHeight is calculated by subtracting the LastEmptyHeightRemaininginFootnoteBox (149.1 points) from the LastGoodTryHeight (250.9 points). Thus, the NewTryHeight calculated here is equal to 100.8 points. Since the NewTryHeight (100.8 points) satisfies the condition that it is less than or equal to the LastBadTryHeight (100.8 points), however, the NewTryHeight is recalculated by summing the LastGoodTryHeight (250.9 points) with the LastBadTryHeight (100.8 points), and dividing the sum by two (2). Thus, the NewTryHeight, calculated based on the third iteration, is 176.35 points.

FIG. 3d represents a fourth iteration of the anchored element positioning performed by the element anchoring module 110. In the fourth iteration, the height 314 of the box in which the anchored element 306 is composed is 176.35 points. In the fourth iteration, the anchored element 306 again fits entirely within the box. Thus, the element anchoring module 110 calculates, for the fourth iteration, an amount of space 316 between the bottom of the anchored element 306 and a bottom boundary of the box. The amount of space 316 represented in FIG. 3d is 57.75 points. Given that the anchored element 306 fits entirely within the box and that the amount of space 316 is greater than zero, the element anchoring module 110 computes both the LastGoodTryHeight and the LastEmptyHeightRemaininginFootnoteBox in conjunction with the fourth iteration. After the fourth iteration, the LastGoodTryHeight is 176.35 points and the LastEmptyHeightRemaininginFootnoteBox is 57.75 points.

Using these values, the element anchoring module 110 then computes the NewTryHeight in conjunction with the fourth iteration and according to the pseudo code above. It follows then that the NewTryHeight is calculated by subtracting the LastEmptyHeightRemaininginFootnoteBox (57.75 points) from the LastGoodTryHeight (176.35 points). Thus, the NewTryHeight calculated here is equal to 118.6 points, which does not satisfy the condition that it is less than or equal to the LastBadTryHeight (100.8 points). Accordingly, a NewTryHeight of 118.6 points can be used for the next iteration.

FIG. 3e represents a fifth iteration of the anchored element positioning performed by the element anchoring module 110. In the fifth iteration, the height 314 of the box in which the anchored element 306 is composed is 118.6 points. In the fifth iteration, the anchored element 306 cannot fit entirely within the box (e.g., it is overset), and is thus another bad try. Given that the anchored element 306 does not fit entirely within the box used in the fifth iteration, the element anchoring module 110 sets the LastBadTryHeight to the value of the NewTryHeight, which in this case is 118.6 points. The NewTryHeight is again calculated according to the pseudo code above. After the fifth iteration, the calculated NewTryHeight satisfies the condition that it is less than or equal to the LastBadTryHeight. Based on the pseudo code, the NewTryHeight is therefore recalculated by summing the LastGoodTryHeight (176.35 points) with the LastBadTryHeight (118.6 points), and dividing the sum by two. Thus, the NewTryHeight, calculated based on the fifth iteration, is 147.47 points.

FIG. 3f represents a sixth iteration of the anchored element positioning performed by the element anchoring module 110. In the sixth iteration, the height 314 of the box in which the anchored element is composed is 147.47 points. In the sixth iteration, the anchored element 306 again fits entirely within the box. Thus, the element anchoring module 110 calculates, for the sixth iteration, an amount of space 316 between the bottom of the anchored element 306 and a bottom boundary of the box. The amount of space 316 represented in FIG. 3f is 12.07 points. Given that the anchored element 306 fits entirely within the box and that the amount of space 316 is greater than zero, the element anchoring module 110 computes both the LastGoodTryHeight and the LastEmptyHeightRemaininginFootnoteBox in conjunction with the sixth iteration. After the sixth iteration, the LastGoodTryHeight is 147.47 points and the LastEmptyHeightRemaininginFootnoteBox is 12.07 points.

Using these values, the element anchoring module 110 then computes the NewTryHeight in conjunction with the sixth iteration and according to the pseudo code above. It follows then that the NewTryHeight is calculated by subtracting the LastEmptyHeightRemaininginFootnoteBox (12.07 points) from the LastGoodTryHeight (147.47 points). Thus, the NewTryHeight calculated here is equal to 135.4 points, which does not satisfy the condition that it is less than or equal to the LastBadTryHeight (118.6 points). Accordingly, a NewTryHeight of 135.4 points can be used for the next iteration.

FIG. 3g represents a seventh iteration of the anchored element positioning performed by the element anchoring module 110. In the seventh iteration, the height 314 of the box in which the anchored element 306 is composed is 135.4 points. In the seventh iteration, the anchored element 306 again fits entirely within the box. Thus, the element anchoring module 110 calculates, for the seventh iteration, an amount of space 316 between the bottom of the anchored element 306 and a bottom boundary of the box. The amount of space 316 represented in FIG. 3g is 1.0 points. Given that the anchored element 306 fits entirely within the box and that the amount of space 316 is greater than zero, the element anchoring module 110 computes both the LastGoodTry-Height and the LastEmptyHeightRemaininginFootnoteBox in conjunction with the seventh iteration. After the seventh iteration, the LastGoodTryHeight is 135.4 points and the LastEmptyHeightRemaininginFootnoteBox is 1.0 points.

Using these values, the element anchoring module 110 then computes the NewTryHeight in conjunction with the seventh iteration and according to the pseudo code above. It follows then that the NewTryHeight is calculated by subtracting the LastEmptyHeightRemaininginFootnoteBox (1.0 points) from the LastGoodTryHeight (135.4 points). Thus, the NewTryHeight calculated here is equal to 134.4 points, which does not satisfy the condition that it is less than or equal to the LastBadTryHeight (118.6 points). Accordingly, a NewTryHeight of 134.4 points can be used for the next iteration.

FIG. 3h represents an eighth iteration of the anchored element positioning performed by the element anchoring module 110. In the eighth iteration, the height 314 of the box in which the anchored element is composed is 134.4 points. In the eighth iteration, the anchored element 306 again fits entirely within the box. Thus, the element anchoring module 110 calculates, for the eighth iteration, an amount of space 316 between the bottom of the anchored element 306 and a bottom boundary of the box. After the eighth iteration, there is no remaining space between the anchored element 306 and the bottom boundary of the box. Consequently, the anchored element 306 is considered "fit" within the non-rectangular frame 302, such that no more iterations are performed by the element anchoring module 110.

In one or more embodiments, anchored elements may be fit at a bottom of a non-rectangular frame such that there is at least some space between the anchored elements and the bottom boundary. For example, a user may choose to have the anchored elements be fit within the non-rectangular frame so that the space between the anchored elements and the bottom boundary is 1.0 points. Alternately or in addition, a user may select to base the space between the anchored elements and the bottom boundary on paragraph spacing (e.g., single, double, and so on), font size, and so forth. In any case, the space between the anchored elements and the bottom boundary may be set to a value other than zero points without departing from the spirit and scope of the techniques described herein.

The element anchoring module 110 also represents functionality beyond simply fitting anchored elements within and at a bottom of a non-rectangular frame. For example, the element anchoring module 110 may be configured to fit anchored elements into multiple columns of a non-rectangular frame.

FIG. 4a depicts an example embodiment at 400 showing anchored text elements that are fit within a non-rectangular frame having columns. In particular, FIG. 4a includes non-rectangular frame 402, which has columns 404, 406. The non-rectangular frame 402 depicted in FIG. 4a also includes anchored elements 408, 410, which are fit within the non-rectangular frame 402 using the techniques described herein. When a non-rectangular frame has multiple columns, the element anchoring module 110 may determine whether the anchored elements (e.g., anchored elements 408, 410 in this example) will fit entirely within one of the columns. For example, the element anchoring module 110 may determine whether anchored elements 408, 410 both fit entirely within column 404.

Based on a determination that the anchored elements do not fit entirely within one column, the element anchoring module 110 may split the anchored elements into multiple portions. In the illustrated example, the element anchoring module 110 may have determined to split anchored elements 408, 410 such that one portion includes most, but not all, text of anchored element 408, and another portion includes the rest of the text of anchored element 408, and text of anchored element 410. The element anchoring module 110 may then fit the one portion within column 404 and the other portion within the column 406 (e.g., the next column). In doing so, the element anchoring module 110 may fit the anchored elements 408, 410 within and at a bottom of each column 404, 406 of the non-rectangular frame 402. The anchored elements 408, 410 may be considered fit "within" the columns 404, 406 insofar as they do not extend outside boundaries of the columns.

The element anchoring module 110 also represents functionality to wrap anchored elements around other elements (e.g., images) located in a region of the non-rectangular frame where the anchored elements are to be fit. FIG. 4b depicts an example embodiment at 412 showing anchored text elements that are wrapped around an image element located in a non-rectangular frame.

In FIG. 4b, non-rectangular frame 414 includes image 416, which is located in a region of the non-rectangular frame 414 where anchored elements of the frame are positioned. In embodiments of frame-shaped anchored elements, the element anchoring module 110, when fitting anchored elements within a non-rectangular frame, wraps the anchored elements around other visual elements (e.g., images) located in a region in which the anchored elements are fit. Here, the text of the anchored elements is wrapped around the image 416 so that it is not obscured.

It should also be noted in FIG. 4b that the text of the anchored elements is hyphenated. When composing anchored elements within a non-rectangular frame, the element anchoring module 110 may hyphenate text to laterally fill a line of text in a region where the anchored elements are to be fit. To do so, the element anchoring module 110 may determine which words to hyphenate, and where hyphens are to be placed within the determined words. Nevertheless, a user may optionally choose that no words are to be hyphenated. When a user chooses not to hyphenate words, the element anchoring module 110 may fit anchored elements within a non-rectangular frame without hyphenating any words of the anchored elements.

Having discussed example details of the techniques for frame-shaped anchored elements, consider now some example procedures to illustrate additional aspects of the techniques.

Example Procedures

This section describes example procedures for frame-shaped anchored elements in one or more embodiments. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some embodiments the procedures may be performed by a suitably configured device, such as the example computing device 102 of FIG. 1 that makes use of an element anchoring module 110.

Figure 5:
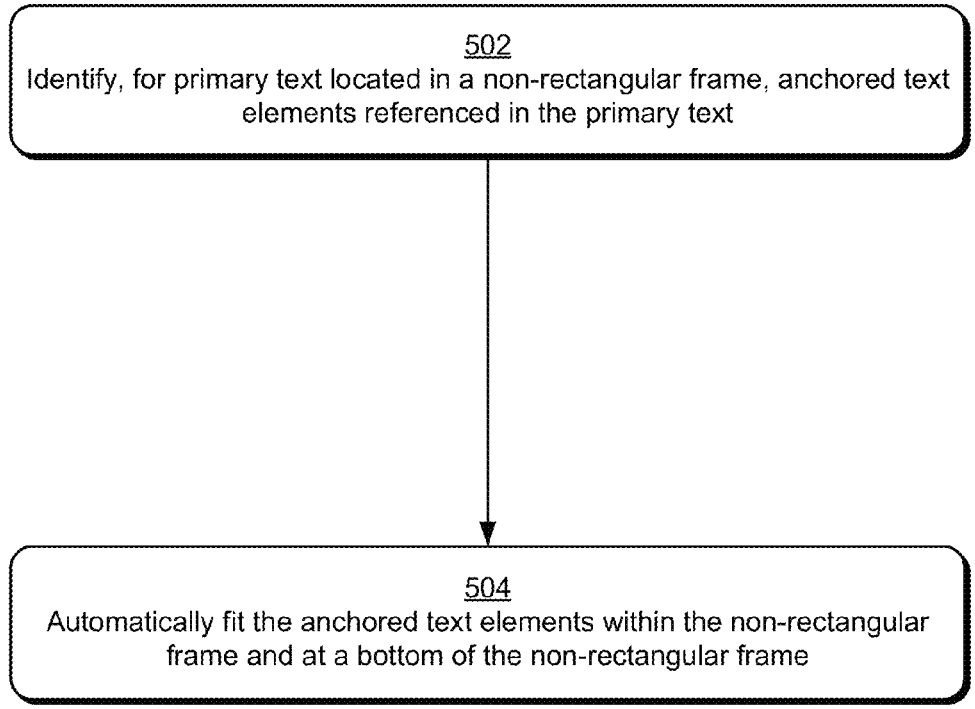
FIG. 5 is a flow diagram depicting an example procedure in accordance with one or more embodiments.

FIG. 5 depicts an example procedure 500 in which anchored text elements are fit within a non-rectangular frame and at a bottom of the non-rectangular frame. Anchored text elements are identified for primary text that is located in a non-rectangular frame and that references the primary text (block 502). For example, the element anchoring module 110 identifies the anchored element 306 for the primary text 304 that is located in the non-rectangular frame 302. The anchored element 306 is referenced in the primary text 304 with the superscripted "1".

The element anchoring module 110 can identify the anchored element 306 in a variety of ways. For example, the element anchoring module 110 can identify the anchored element 306 based on element-entry inputs, such as input from a user to enter the anchored element (e.g., the text of the anchored element itself), a user selection of the anchored element from a list of references, a search automatically performed to ascertain an anchored element for a term or word used in the primary text 304, and so forth. Anchored elements may also be identified for primary text in other ways within the spirit and scope of the techniques described herein.

Once anchored elements are identified, the anchored elements are fit within the non-rectangular frame and at a bottom of the non-rectangular frame (block 504). For example, the element anchoring module 110 fits the anchored element 306 within non-rectangular frame 302. The element anchoring module 110 also fits the anchored element 306 at a bottom of the non-rectangular frame 302. FIG. 3h illustrates an example of how anchored text 304 is fit both within the non-rectangular frame 302 and at a bottom of the non-rectangular frame 302. To fit the anchored element 306 in this way, the element anchoring module 110 initially positions, and then iteratively repositions, the anchored element within the non-rectangular frame 302, as represented by FIGS. 3a-3h, until this desired fit is achieved.

It should be noted that the element anchoring module 110 may fit anchored elements within a non-rectangular frame in conjunction with composition of the primary text in the non-rectangular frame. For example, a user may begin writing primary text for a non-rectangular frame, reference a first anchored element in the primary text, and have the first anchored element fit within and at the bottom of the non-rectangular frame. The user may then continue writing the primary text, in doing so reference a second anchored element in the primary text, and also have the second anchored element fit within the non-rectangular frame.

When reference to the second anchored element is made in the primary text before reference to the first anchored element, the element anchoring module fits the second anchored element within the non-rectangular frame and bottom-aligns the second anchored element with a top of the first anchored element. When reference to the second anchored element is made in the primary text after reference to the first anchored element, however, the element anchoring module 110 bottom-aligns the second anchored element at a bottom of the non-rectangular frame. Regardless of whether the second anchored element is referenced in the primary text before or after the first anchored element, the combined first and second anchored elements are bottom-aligned within the non-rectangular frame, e.g., in the manner that anchored elements 214, 216 are aligned within non-rectangular frame 204.

Figure 6:
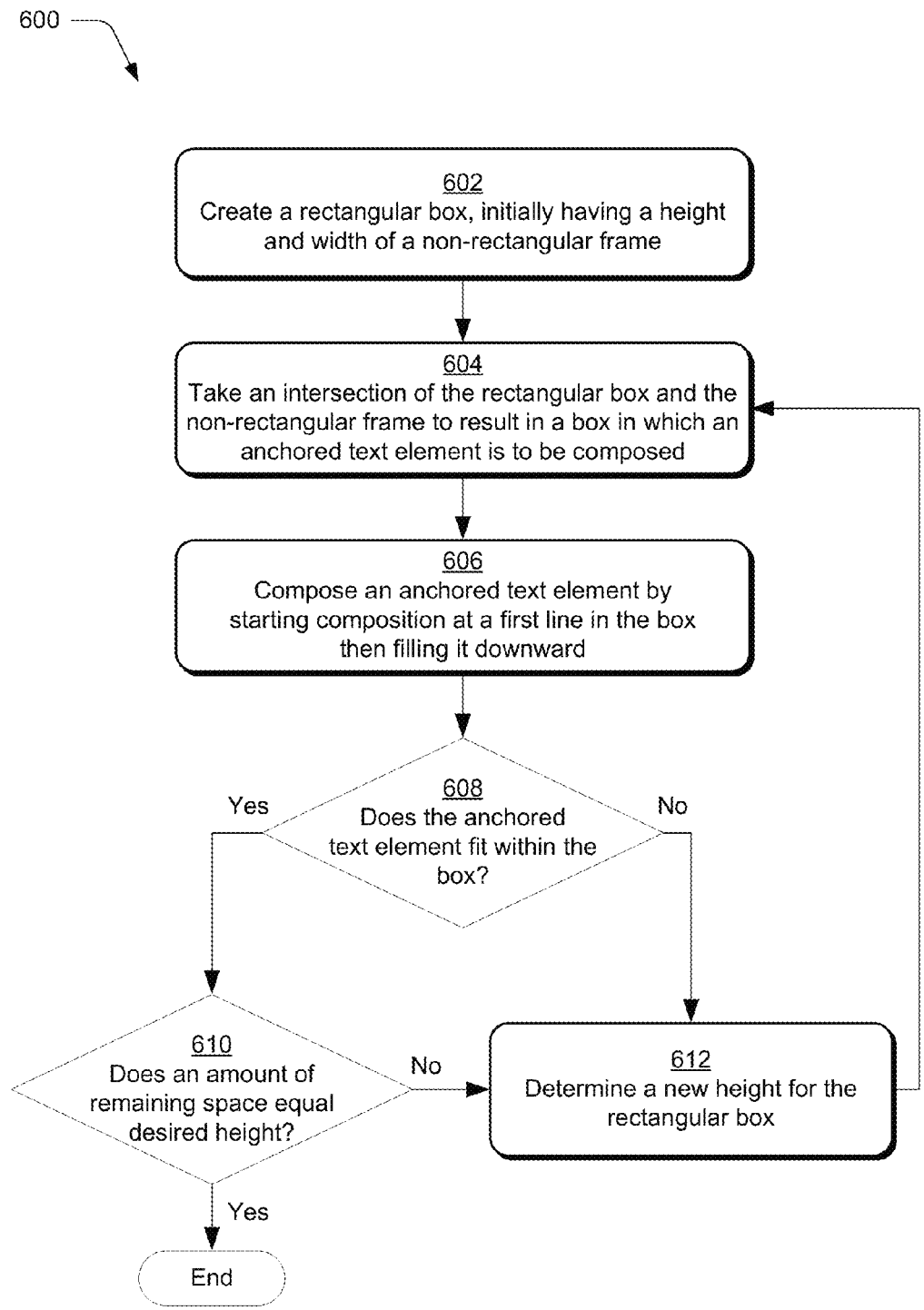
FIG. 6 is a flow diagram depicting another example procedure in accordance with one or more embodiments.

FIG. 6 depicts an example procedure 600 for adjusting the anchored text elements to fit within and at a bottom of a non-rectangular frame. A rectangular box is created (block 602). Initially, the rectangular box has a height and width of the non-rectangular frame. For example, the element anchoring module 110 creates the rectangular box 308 to have height and width that are the same as a height and width of the non-rectangular frame 302.

An intersection of the rectangular box and the non-rectangular frame is taken, resulting in a box in which the anchored elements are to be composed (block 604). For example, the element anchoring module 110 takes an intersection of the rectangular box 308 and the non-rectangular frame 302, resulting in a box in which the anchored element 306 is to be composed. The portion of the rectangular box 308 that is not intersected by the non-rectangular frame 302 is represented by cutouts 310, 312 of FIG. 3, which are depicted using hatching. The anchored element 306 is not to be composed on these cutouts 310, 312.

The anchored element is composed in the box by starting composition at a first line in the box, then filling it downward (block 606). For example, the element anchoring module 110 composes the anchored element 306 beginning at a first line of the box that was created at block 604 by taking the intersection. From that first line, the element anchoring module 110 composes the anchored element 306 by filling the box downward.

It is determined whether an entirety of the anchored element fits within the box (block 608). For example, the element anchoring module 110 determines whether an entirety of the anchored element 306 fits within the box created at block 304 by taking the intersection.

If a determination is made that the anchored element fits entirely within the box (e.g., "yes" at block 608), then it is determined whether an amount of space remaining between a bottom of the anchored element and a bottom boundary of the non-rectangular frame equals a desired height at which the anchored elements are to be set (block 610). For example, the element anchoring module 110 determines that the anchored element 306 fits entirely within the box created at block 604 by the intersection taken. FIGS. 3a, 3c, 3d, 3f, 3g, and 3h represent scenarios in which the anchored element 306 may be determined to fit entirely within the box. In these scenarios, the element anchoring module 110 may then determine whether the amount of space 316 remaining equals a desired height at which the anchored element 306 is to be set.

If the amount of space remaining equals the desired height at which the anchored elements are to be set, then the method ends and the anchored elements are considered to "fit" within the non-rectangular frame. For example, FIGS. 3a-3h represent a scenario in which the desired height for setting the anchored elements is zero points. Further, FIG. 3h represents the case in which the space between a bottom of the anchored element 306 and a bottom boundary of the non-rectangular frame 302 is zero points. Thus, the anchored element 306 is considered to fit in FIG. 3h. Once the case represented by FIG. 3h is achieved, the element anchoring module 110 may cease attempting to find other positions at which to begin composition of the anchored element 306.

If a determination is made that the anchored element does not fit entirely within the box (e.g., "no" at block 608), or the amount of space determined at block 610 does not equal the height at which the anchored elements are to be set (e.g., "no" at block 610), then a new height is determined for the box in which the anchored element is composed (block 612). The method then returns to block 604 to take an intersection of the box with the new height and the non-rectangular frame. For example, the element anchoring module 110 determines for the cases represented in FIGS. 3b and 3e that the anchored element 306 does not fit entirely within the box. For the cases represented in FIGS. 3a, 3c, 3d, 3f, and 3g the element anchoring module 110 determines that the amount of space 316 does not equal the height at which the anchored elements are to be set. For each of these cases, the element anchoring module 110 determines a new height for the box in which the anchored element 306 is to again be composed.

In another example, in which a non-rectangular frame is configured with multiple columns (e.g., non-rectangular frame 402), the element anchoring module 110 may create a rectangular box for the first column 404 with a height and width of the first column 404 in accordance with block 602. The element anchoring module 110 may also take an intersection of the rectangular box and the first column 404 of the non-rectangular frame 402 in accordance with block 604, resulting in a box in which the anchored element is to be composed.

In contrast to a single-column configuration, however, the element anchoring module 110 may not iteratively perform the acts of blocks 606-612 to attempt to fit an entirety of the anchored elements 408, 410 within the first column 404. Instead, the element anchoring module 110 may begin composing the anchored elements 408, 410 after primary text in the first column 404, and compose the anchored elements 408, 410 until there is no space for further composition in the first column 404. The element anchoring module 110 may then split the anchored elements 408, 410 into multiple portions, e.g., a portion that has been composed in the first column 404 and a portion that has not yet been composed.

The element anchoring module 110 may then create a rectangular box for the second column 406 with a height and width of the second column 406 in accordance with block 602. The element anchoring module 110 may take an intersection of this rectangular box and the second column 406 of the non-rectangular frame 402 in accordance with block 604, resulting in a box in which the portion of the anchored elements 408, 410 that has not yet been composed can be fit. The element anchoring module 110 may then perform the acts of blocks 604-612 to iteratively reposition the remaining portion of the anchored elements 408, 410 within and at a bottom of the second column 406.

Having described example procedures in accordance with one or more embodiments, consider now an example system and device that can be utilized to implement the various techniques described herein.

Example System and Device

Figure 7:
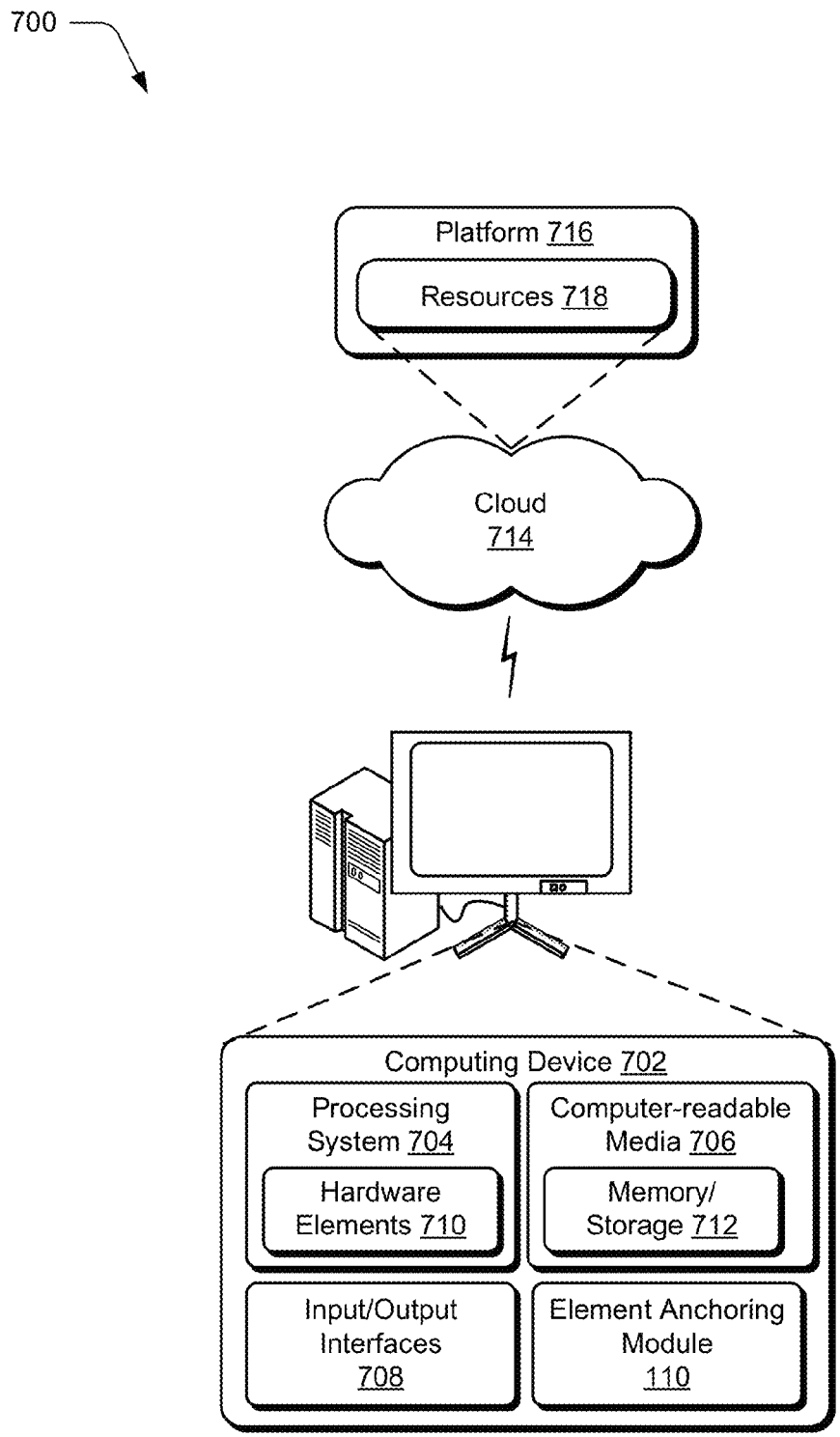
FIG. 7 illustrates an example system including various components of an example device that can be employed for one or more embodiments of frame-shaped anchored elements described herein.

FIG. 7 illustrates an example system generally at 700 that includes an example computing device 702 that is representative of one or more computing systems and/or devices that may implement the various techniques described herein. This is illustrated through inclusion of the element anchoring module 110, which operates as described above. The computing device 702 may be, for example, a server of a service provider, a device associated with a client (e.g., a client device), an on-chip system, and/or any other suitable computing device or computing system.

The example computing device 702 illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   identifying, by the computing device and for primary text located in a non-rectangular frame, one or more anchored text elements referenced in the primary text; and
   fitting, by the computing device, the one or more anchored text elements within the non-rectangular frame and at a bottom of the non-rectangular frame by iteratively repositioning the one or more anchored text elements, including:
   initially positioning the one or more anchored text elements at a top of the non-rectangular frame; and
   repositioning the one or more anchored text elements at a next computed position, including composing the one or more anchored text elements starting from the next computed position, until there are zero points of space between a bottom of the one or more anchored text elements and the bottom of the non-rectangular frame and until the one or more anchored text elements fit entirely within the non-rectangular frame.

2. A method as described in claim 1, wherein the one or more anchored text elements each comprise a footnote or an endnote.

3. A method as described in claim 1, wherein a font size of the primary text and the one or more anchored text elements is measured in points, and the zero points of space corresponds to a font size measurement.

4. A method as described in claim 1, wherein fitting the one or more anchored text elements within the non-rectangular frame is performed without receiving element-fitting inputs to fit the one or more anchored text elements within the non-rectangular frame.

5. A method as described in claim 1, wherein the non-rectangular frame comprises a text box.

6. A method as described in claim 5, wherein the text box is included within a document.

7. A method as described in claim 1, wherein the non-rectangular frame includes an image element located in a region where the one or more anchored text elements are to be fit, and automatically fitting the one or more anchored text elements includes wrapping the one or more anchored text elements around the image element.

8. A method as described in claim 1, wherein the non-rectangular frame is configured with multiple columns, and automatically fitting the one or more anchored text elements within the multi-column non-rectangular frame includes splitting the one or more anchored text elements into multiple portions responsive to a determination that the one or more anchored text elements do not fit at a bottom of one of the columns.

9. A method as described in claim 8, wherein automatically fitting the one or more anchored text elements within the multi-column non-rectangular frame further includes fitting a first of the multiple portions at the bottom of the one column and fitting a second of the multiple portions at a bottom of a next said column.

10. A method implemented by a computing device, the method comprising:
receiving one or more element-entry inputs for an anchored text element that is to be referenced by primary text located in a non-rectangular frame; and
fitting the anchored text element within the non-rectangular frame without receiving element-fitting inputs to fit the anchored text element, the fitting including:
anchoring the anchored text element to an anchor comprising at least one of a bottom of the non-rectangular frame or another anchored text element that is referenced in the primary text after the anchored text element is referenced; and
iteratively repositioning the anchored text element by:
initially positioning the anchored text element at a top of the non-rectangular frame; and
repositioning the anchored text element at a next computed position, including composing the anchored text element from the next computed position, until there are zero points of space between a bottom of the anchored text element and the anchor and until the anchored text element fits entirely within the non-rectangular frame above the anchor.

11. A method as described in claim 10, wherein fitting the anchored text element within the non-rectangular frame further includes wrapping the anchored text element around visual elements located in a region of the non-rectangular frame where the anchored text element is to be located.

12. A method as described in claim 10, wherein the non-rectangular frame is configured with multiple columns, and fitting the anchored text element within the non-rectangular frame further includes splitting the anchored text element into multiple portions responsive to a determination that the anchored text element will not fit entirely at a bottom of one of the columns.

13. A method as described in claim 12, wherein fitting the anchored text element within the non-rectangular frame further includes fitting a first of the multiple portions at the bottom of the one column and fitting a second of the multiple portions in a next said column.

14. A system comprising:
an element anchoring module implemented at least partially in hardware, the element anchoring module configured to perform operations comprising:
determining how far below text, that is located in a non-rectangular frame, to position, in the non-rectangular frame, one or more anchored text elements that are referenced in the text, the determining including:
initially positioning the one or more anchored text elements within the non-rectangular frame; and
iteratively repositioning the one or more anchored text elements until both:
the one or more anchored text elements fit entirely within the non-rectangular frame; and
there is no space between a bottom of the one or more anchored text elements and a bottom boundary of the non-rectangular frame.

15. A system as described in claim 14, wherein the one or more anchored text elements, once finally positioned according to the determining, do not extend outside boundaries of the non-rectangular frame.

16. A system as described in claim 14, wherein initially positioning the one or more anchored text elements and iteratively repositioning the one or more anchored text elements include:
computing a first line in the non-rectangular frame at which to begin composition of the one or more anchored text elements; and
composing the one or more anchored text elements from the line to downward fill a region of the non-rectangular frame between the first line and the bottom boundary of the non-rectangular frame.

17. A system as described in claim 16, wherein composition of the one or more anchored text elements is stopped responsive to a determination that a composed portion of the one or more anchored text elements has filled a last line in the region, the composed portion comprising less than an entirety of the one or more anchored text elements, and, based on the determination, the one or more anchored text elements being repositioned at least one more time.

18. A system as described in claim 16, wherein composing the one or more anchored text elements includes wrapping the one or more anchored text elements around one or more visual elements located in the region.

19. A system as described in claim 14, wherein the non-rectangular frame is configured with multiple columns, and the operations further comprise:
splitting the one or more anchored text elements into multiple portions responsive to a determination that the one or more anchored text elements will not fit entirely at a bottom of one of the columns; and
fitting a first of the multiple portions at the bottom of the one column and a second of the multiple portions in a next said column.

20. A system as described in claim 14, wherein the one or more anchored text elements comprise footnotes or endnotes, and the non-rectangular frame comprises a text box.

* * * * *